(12) United States Patent
Asanuma et al.

(10) Patent No.: US 6,896,082 B2
(45) Date of Patent: May 24, 2005

(54) ROAD SURFACE DETECTION APPARATUS AND APPARATUS FOR DETECTING UPWARD/DOWNWARD AXIS DISPLACEMENT OF VEHICLE-MOUNTED RADAR

(75) Inventors: Hisateru Asanuma, Kobe (JP); Masayuki Kishida, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 109 days.

(21) Appl. No.: 10/181,743

(22) PCT Filed: Dec. 21, 2001

(86) PCT No.: PCT/JP01/11302
§ 371 (c)(1),
(2), (4) Date: Jul. 19, 2002

(87) PCT Pub. No.: WO02/054105
PCT Pub. Date: Jul. 11, 2002

(65) Prior Publication Data
US 2002/0189875 A1 Dec. 19, 2002

(30) Foreign Application Priority Data
Dec. 27, 2000 (JP) ........................................ 2000-398878

(51) Int. Cl.⁷ ................................................ B60T 7/16
(52) U.S. Cl. ........................................ 180/169; 342/70
(58) Field of Search ............................. 342/70, 71, 72; 180/167, 169; 702/183

(56) References Cited

U.S. PATENT DOCUMENTS

| | | | |
|---|---|---|---|
| 4,316,173 A | | 2/1982 | Matsumura et al. |
| 6,026,353 A | * | 2/2000 | Winner ........................ 702/183 |
| 6,124,823 A | | 9/2000 | Tokoro |
| 6,246,949 B1 | * | 6/2001 | Shirai et al. ................... 701/96 |
| 6,437,731 B1 | * | 8/2002 | Henrio et al. ................ 342/165 |
| 6,445,337 B1 | * | 9/2002 | Reiche ........................ 342/104 |
| 6,476,760 B1 | * | 11/2002 | Winter et al. ................ 342/173 |
| 2002/0105456 A1 | * | 8/2002 | Isaji ............................ 342/165 |

FOREIGN PATENT DOCUMENTS

| | | |
|---|---|---|
| DE | 30 22 048 C2 | 1/1981 |
| DE | 30 22 048 C2 | 2/1982 |
| DE | 199 29 794 A1 | 1/2000 |
| EP | 0 896 896 A2 | 2/1999 |
| EP | 0 896 896 A3 | 2/1999 |
| GB | 2 052 204 A | 1/1981 |
| JP | 56-665 | 1/1981 |
| JP | 56-665 | 7/1981 |
| JP | 7-209414 | 8/1995 |
| JP | 8-292260 | 11/1996 |
| JP | 11-109030 | 4/1999 |
| JP | 2000-19242 | 1/2000 |
| WO | WO00/75686 A1 | 12/2000 |

OTHER PUBLICATIONS

European Search Report, dated Sep. 7, 2004, for Application No. 01272839.0–1248, Fujitsu Ten Limited.
International Search Report of PCT/JP01/11302, dated Jan. 29, 2002.
European Search Report for Application No. 01272839.0, dated Oct. 29, 2004, in the name of Fujitsu Ten Limited.

* cited by examiner

Primary Examiner—Bryan Fischmann
(74) Attorney, Agent, or Firm—Christie, Parker and Hale LLP

(57) ABSTRACT

A road surface detection apparatus capable of detecting an upward/downward displacement in radar axis when detecting a road surface by projecting a radar beam. The apparatus projects a radar beam signal onto the road surface on which the radar-equipped vehicle is traveling, and receives a signal containing a reflected signal of the radar beam signal. Then, the apparatus compares the level of the road surface reflected signal contained in the received signal with a predetermined reference level and, if the result of the comparison lies outside a predefined range, then the apparatus determines that the axis defining the projection direction of the radar beam signal is displaced.

9 Claims, 14 Drawing Sheets

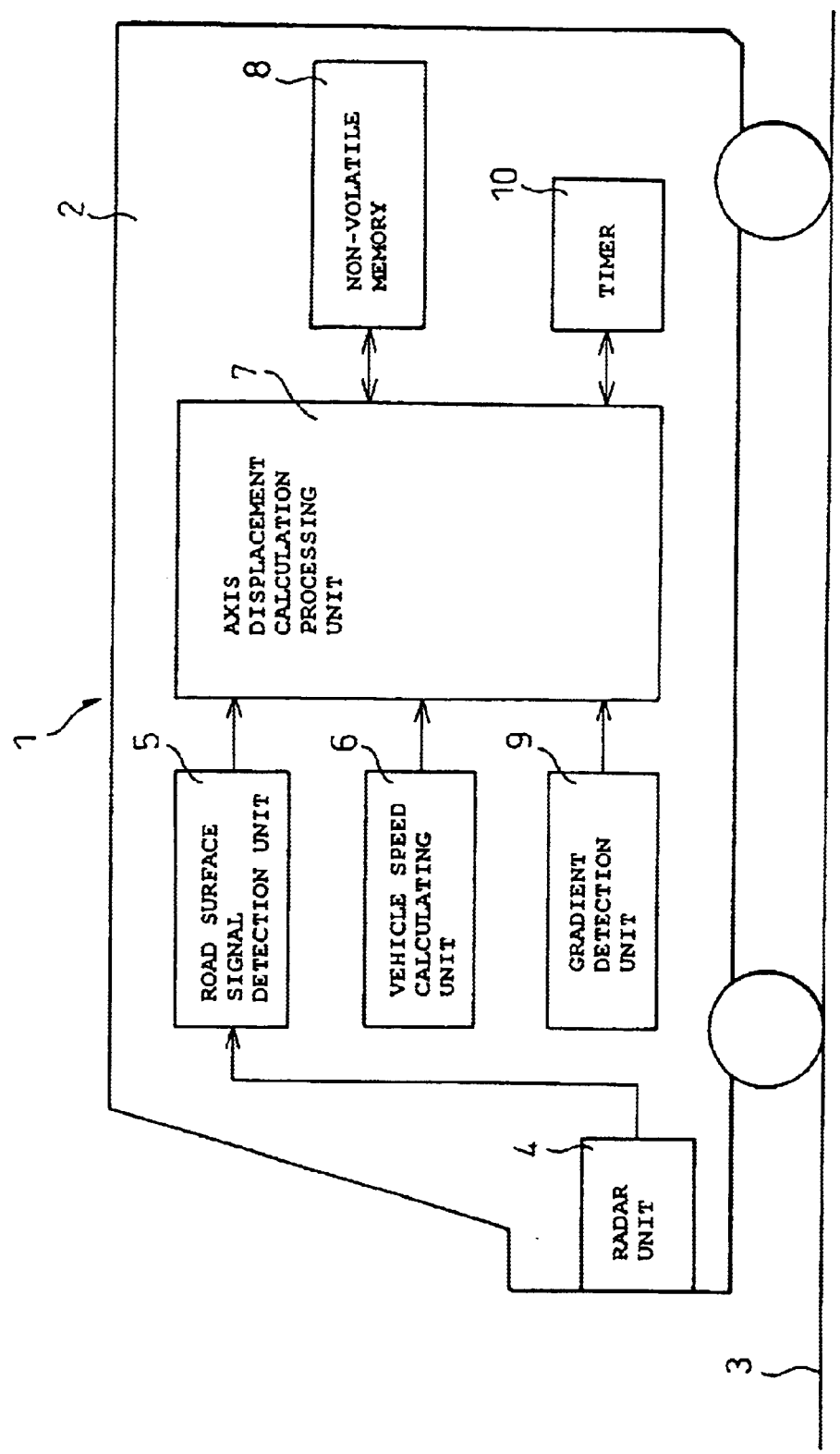

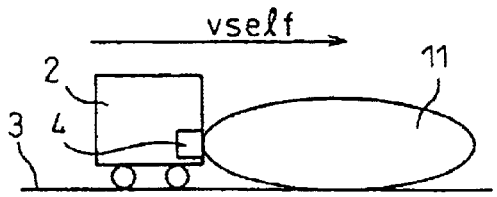
Fig.2A1
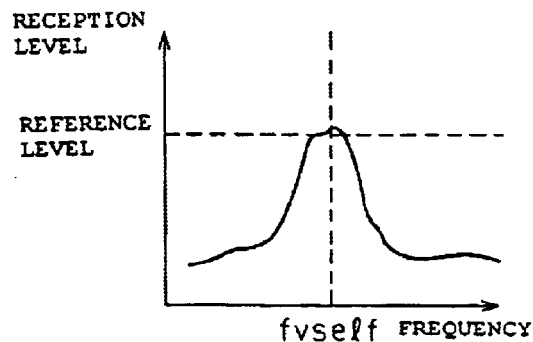
Fig.2B1
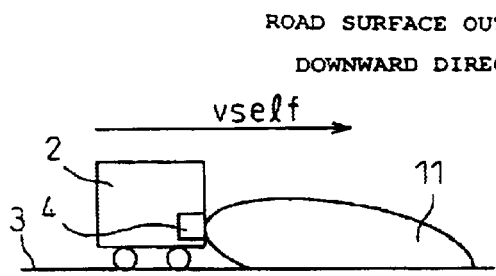
Fig.2A2
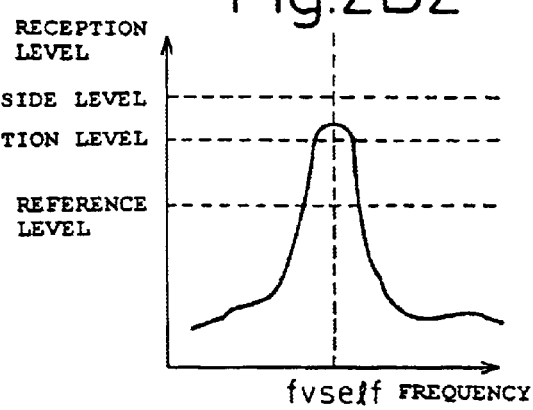
Fig.2B2
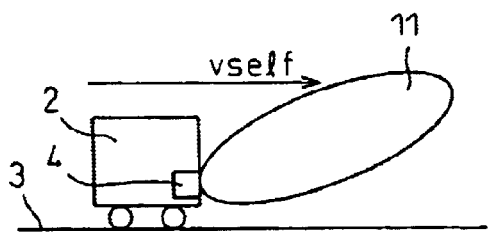
Fig.2A3
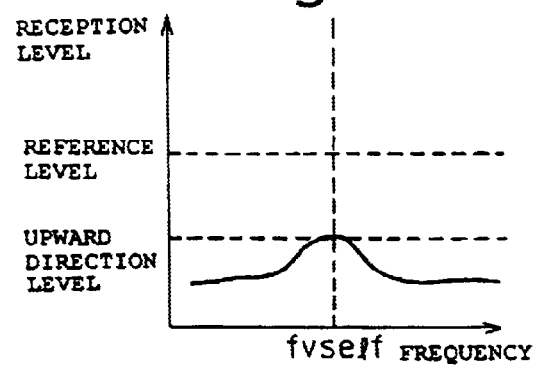
Fig.2B3

ROAD SURFACE DETECTION APPARATUS AND APPARATUS FOR DETECTING UPWARD/DOWNWARD AXIS DISPLACEMENT OF VEHICLE-MOUNTED RADAR

CROSS-REFERENCE TO RELATED APPLICATION

This application claims priority of International application number PCT/JP01/11302, filed Dec. 21, 2001, which in turn claims priority of Japanese application number 2000-398878, filed Dec. 27, 2000.

TECHNICAL FIELD

The present invention relates to a road surface detection apparatus for detecting, using a Doppler radar or the like, the road surface on which a vehicle is traveling. The invention also relates to an apparatus for detecting an axis displacement, in an upward or downward direction, of a radar mounted on a vehicle.

BACKGROUND ART

Heretofore, various kinds of radar systems have been developed for automotive applications and for such purposes as increasing vehicle driving safety. Automotive radar systems so far developed include those that use laser beams or ultrasonic waves, and those that use radio waves, especially millimeter waves in the wavelength region called the millimeter band, such as a frequency-modulated continuous-wave (FM-CW) radar system, an unmodulated continuous-wave (CW) radar system, or a pulse Doppler radar system, as disclosed, for example, in Japanese Unexamined Patent Publication No. 7-209414.

Such automotive radar systems are used to detect a vehicle traveling ahead, an obstacle lying in the path of the radar-equipped vehicle, or a wall or fence on the roadside ahead. Since the scanning range of an automotive radar system covers the road surface, the automotive radar system also receives a signal reflected off the road surface. When the signal reflected by the road surface is received while the vehicle is in motion, the received signal is shifted in frequency from the radar beam signal emitted from the vehicle because of the Doppler effect due to the motion of the vehicle. By detecting this frequency shift, the vehicle speed relative to the road surface can be calculated.

Generally, in a vehicle, vehicle speed is measured by detecting the rotation of the drive shaft and converting its rotational speed into the vehicle speed. However, if slip occurs between a wheel and the ground, the wheel speed does not necessarily agree with the vehicle speed. On the other hand, if provisions are made to measure the relative speed between the vehicle and the ground based on the Doppler shift frequency, accurate vehicle speed can be detected regardless of wheel slip. For example, in the case of a construction machine such as a power shovel, since tires can easily spin, the tire speed does not necessarily agree with the vehicle speed. Also, in a vehicle equipped with an antilock brake system (ABS) which allows the brakes to be applied up to the limit of wheel lock, there is a need to measure the vehicle speed without relying on the wheel speed. Vehicle speed measurement based on road surface detection using a radar system is an effective means for such purposes.

As earlier described, automotive radar can also be used as a road surface detection apparatus for detecting the vehicle speed relative to the road surface. In an automotive radar system, the direction in which the radar beam signal is projected forward of the vehicle may become displaced from the optimum direction for road surface detection because of the vibrations and shocks that the vehicle in motion undergoes.

Japanese Unexamined Patent Publication No. 7-209414 discloses a configuration in which, in an automotive radar system, the center direction, when changing the radar beam projection direction within a plane parallel to the road surface, is made to coincide with the straight forward traveling direction of the vehicle. However, displacements of the radar beam projection direction are not limited to within the plane parallel to the road surface, but should also contain components working in directions vertical to the road surface, that is, upward and downward directions when the road surface is a horizontal surface.

Automotive radar, mounted on the front of a vehicle, is also used widely for measuring the distance to a target such as a vehicle ahead. In such automotive radar, the radar beam axis relative to the upward/downward directions must be maintained horizontal with respect to the road surface so that the vehicle ahead can be detected reliably.

If the radar axis is displaced, there occurs the problem that the detection range of the radar becomes shorter. As a result, in a vehicle equipped with a radar system, diagnosis must be performed to check the radar axis for displacement. However, an apparatus for detecting such an axis displacement in a simple and accurate manner has not been available up to this date.

SUMMARY OF THE INVENTION

The present invention has been devised in view of the above problem, and an object of the invention is to provide an apparatus for detecting, in a simple and accurate manner, an upward/downward axis displacement which is a major concern in an automotive radar.

It is another object of the present invention to provide a road surface detection apparatus capable of detecting an upward/downward axis displacement when detecting a road surface by projecting a radar beam.

To achieve the above objects, according to a first aspect of the present invention, there is provided a road surface detection apparatus, mounted on a vehicle, for gathering information about a road surface, comprising: transmitting/receiving means for projecting a radar beam signal onto the road surface on which the vehicle is traveling, and for receiving a signal containing a reflected signal of the radar beam signal; and axis displacement determining means for comparing the level of the reflected signal, reflected from the road surface and contained in the signal received by the transmitting/receiving means, with a predetermined reference level and, if the result of the comparison lies outside a predefined range, then determining that an axis defining the projection direction of the radar beam signal is displaced.

Further, according to a second aspect of the present invention, there is provided a road surface detection apparatus, mounted on a vehicle, for gathering information about a road surface by projecting a radar beam signal onto the road surface on which the vehicle is traveling, and by receiving a signal containing a reflected signal of the radar beam signal reflected from the road surface, the apparatus comprising: road surface signal detecting means for detecting the reflected signal reflected from the road surface and contained in the received signal; storage means for pre-storing, as a reference level, the reception level of the reflected signal reflected from the road surface and detected by the road surface signal detecting means when there is no axis displacement in the projection direction of the radar beam signal; and axis displacement determining means for comparing, when the vehicle is traveling, the reception level of the reflected signal reflected from the road surface and detected by the road surface signal detecting means with the reference level stored in the storage means and, if the result of the comparison lies outside a predefined range, then determining that an axis defining the projection direction of the radar beam signal is displaced.

In the road surface detection apparatus, when there is no axis displacement in the projection direction of the radar beam signal, for example, immediately after a radar beam projecting antenna or the like is mounted on the vehicle and verified to have been oriented in the correct projection direction, the level of the signal received by the road surface signal detecting means is taken as the reference level and stored in the storage means. During driving, the vehicle is subjected to vibrations, and the projection direction of the radar signal can vary due to the vibrations. However, since it is determined that the axis is displaced when the difference between the reception level and the reference level is larger than the predefined range which is larger than the range of the variation caused by the vibration of the vehicle in motion, the upward/downward displacement in the axis can be determined reliably.

According to a third aspect of the present invention, preferably, the axis displacement determining means determines that the axis is displaced in a downward direction when the reception level detected by the road surface signal detecting means has been outside the predefined range on the higher side of the reference level for a predetermined period of time. That is, when the projection direction of the radar beam is tilted downward, as the reception level of the signal reflected from the road surface increases, it can be determined that the axis of the projection direction of the radar beam is displaced downward.

According to a fourth aspect of the present invention, preferably, the axis displacement determining means determines that the reception level is for a signal reflected from an object other than the road surface, and does not determine that the axis is displaced in the downward direction, when the reception level detected by the road surface signal detecting means has been equal to or higher than a road surface outside level preset at a point higher than the predefined range for the predetermined period of time. That is, when the reception level of the signal reflected from the road surface and detected by the road surface signal detecting means is higher than the reference level and is equal to or higher than the road surface outside level preset at a point higher than the predefined range, it is not determined that the axis is displaced, because the probability of the reception level being that of a signal reflected from an object other than the road surface, such as an obstacle lying on the road or a vehicle parked on the road, is much higher than the probability of the reception level being increased due to an axis displacement.

According to a fifth aspect of the present invention, preferably, the axis displacement determining means determines that the axis is displaced in an upward direction, when the reception level detected by the road surface signal detecting means has been outside the predefined range on the lower side of the reference level for the predetermined period of time. That is, when the axis of the projection direction of the radar beam signal is displaced upward, it becomes difficult to receive the reflected signal from the road surface, and the reception level drops. When the reception level becomes lower than the reference level and drops below the predefined range, it is determined that the reception level has dropped due to an axis displacement by an amount greater than the range of the variation caused by the motion of the vehicle, and that the axis is displacement upward.

According to a sixth aspect of the present invention, preferably, the road surface detection apparatus further includes gradient detecting means for detecting the gradient of the road on which the vehicle is traveling wherein, when performing the axis displacement determination, the axis displacement determining means compares the reception level detected by the road surface signal detecting means with the reference level after correcting the reception level based on the gradient of the road detected by the gradient detecting means. By so doing, the axial displacement determination in a sloping road section can be performed correctly.

According to a seventh aspect of the present invention, preferably, the axis displacement determining means stores the result of the axis displacement determination in the storage means. Therefore, if it is found that the axis is displaced, the projection direction of the radar beam can be corrected properly at a factory, etc. by reading out and checking the stored contents of the storage means.

Further, according to an eighth aspect of the present invention, there is provide an apparatus for detecting an axis displacement in an upward or downward direction for a radar mounted on a vehicle, comprising: means for gathering data on a minimum detection distance for an overhead stationary object detected by the radar; means for calculating, based on the gathered data, the frequency with which the minimum detection distance is less than a first threshold value; and means for determining that the axis of the radar is displaced in the upward or downward direction, if the frequency is higher than a second threshold value.

According to a ninth embodiment of the present invention, there is provided an apparatus for detecting an axis displacement in an upward or downward direction for a radar mounted on a vehicle, comprising: means for gathering data on a maximum detection distance for a moving object detected by the radar; means for calculating, based on the gathered data, the frequency with which the maximum detection distance is less than a first threshold value; and means for determining that the axis of the radar is displaced in the upward or downward direction, if the frequency is higher than a second threshold value.

According to a 10th embodiment of the present invention, there is provided an apparatus for detecting an axis displacement in an upward or downward direction for a radar mounted on a vehicle, comprising: means for calculating an average value of reflection levels for a moving object detected by the radar, the average value being calculated for each prescribed distance range over a predetermined period of time; and means for determining that the axis of the radar is displaced in the upward or downward direction, if the calculated average value is less than a predetermined threshold value.

According to an 11th embodiment of the present invention, there is provided an apparatus for detecting an axis displacement in an upward or downward direction for a radar mounted on a vehicle, comprising: means for detecting a control re-setting operation or a braking operation during vehicle-to-vehicle distance control performed using the radar; and means for determining that the axis of the radar is displaced in the upward or downward direction, if the frequency of the re-setting operation or braking operation detected is higher than a predetermined threshold value.

BRIEF DESCRIPTION OF THE DRAWINGS

FIG. 1 is a diagram schematically showing the electrical configuration of a road surface detection apparatus according to one embodiment of the present invention.

FIGS. 2A1 to 2A3 and 2B1 to 2B3 are diagrams illustrating the concept of how axial displacement of a radar beam 11 is determined in the road surface detection apparatus of FIG. 1.

FIG. 3 is a flowchart illustrating a procedure for determining the presence or absence of an axis displacement in accordance with the concept of FIG. 2.

FIG. 5A shows the state in which the axis is not displaced, FIG. 5B shows the state in which the axis is displaced in the upward direction, and FIG. 5C shows the state in which the axis is displaced in the downward direction.

FIG. 6A shows the state in which the axis is not displaced, FIG. 6B shows the state in which the axis is displaced in the upward direction, and FIG. 6C shows the state in which the axis is displaced in the downward direction.

FIG. 8A shows the state in which the axis is not displaced, FIG. 8B shows the state in which the axis is displaced in the upward direction, and FIG. 8C shows the state in which the axis is displaced in the downward direction.

FIG. 9A shows the state in which the axis is not displaced, FIG. 9B shows the state in which the axis is displaced in the upward direction, and FIG. 9C shows the state in which the axis is displaced in the downward direction.

FIG. 11A shows the state in which the axis is not displaced, FIG. 11B shows the state in which the axis is displaced in the upward direction, and FIG. 11C shows the state in which the axis is displaced in the downward direction.

FIG. 13A shows the state in which the axis is not displaced, FIG. 13B shows the state in which the axis is displaced in the upward direction, and FIG. 13C shows the state in which the axis is displaced in the downward direction.

DETAILED DESCRIPTION

Figure 3:
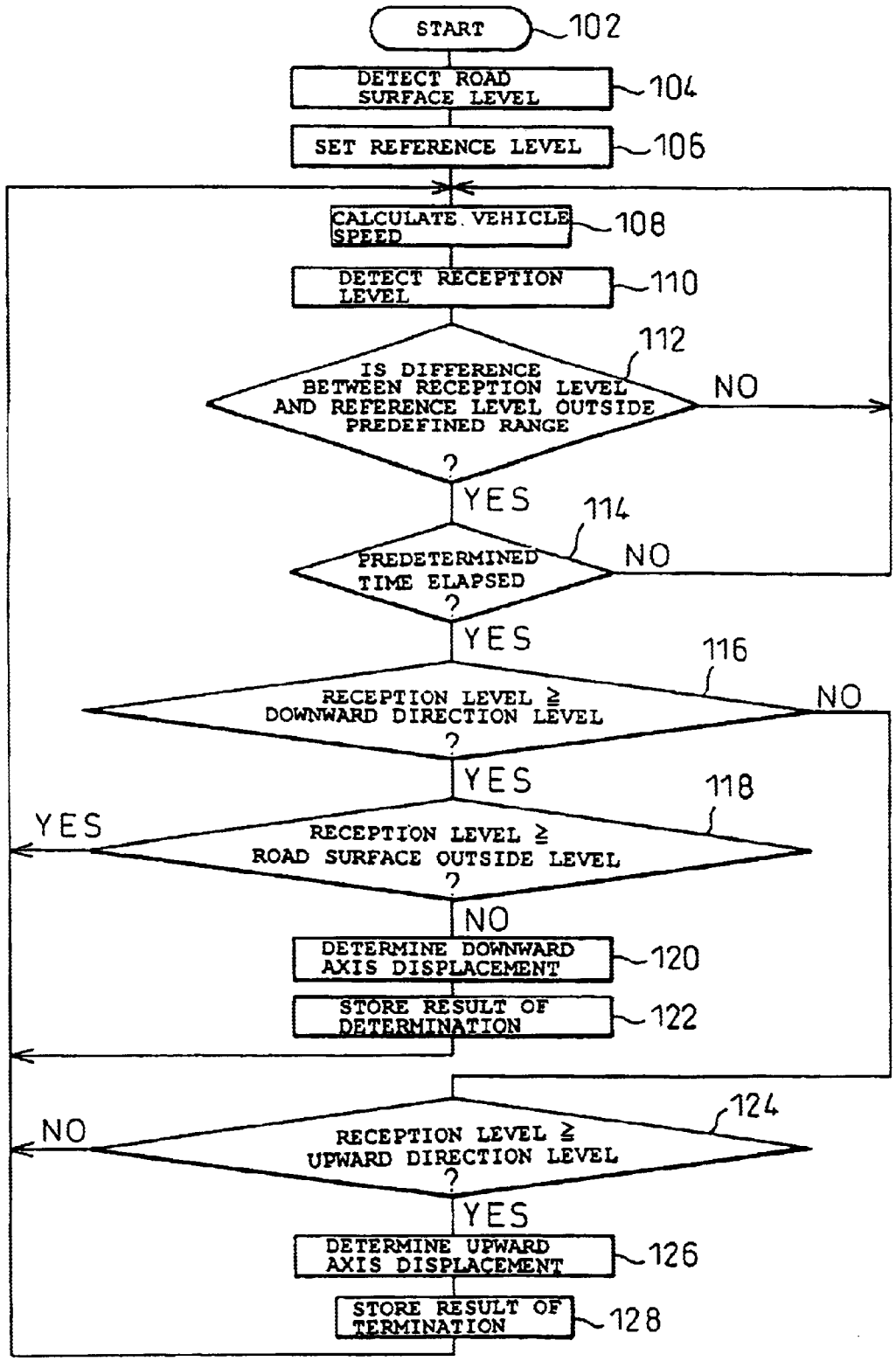

FIG. 1 is a diagram schematically showing the configuration of a road surface detection apparatus 1 according to one embodiment of the present invention. The road surface detection apparatus 1 is mounted on a vehicle 2, and detects the road surface 3 on which the vehicle 2 is traveling by projecting a radar beam from a radar unit 4 onto the road surface. When a radar beam, for example, an electromagnetic wave in the millimeter band, is projected from the radar unit 4 via a highly directional antenna, the radar beam is scattered by the road surface 3, and signal components reflected in the direction opposite to the projection direction are received by a road surface signal detection unit 5 for detection of the road surface 3.

The road surface signal detection unit 5 detects the road surface by determining that, of the received signal components, the signal component that experienced a Doppler shift proportional to the traveling speed of the vehicle 2, which is calculated by a vehicle speed calculating unit 6 based, for example, on vehicle speed pulses corresponding to the wheel speed, is the reflected signal from the road surface 3. of the signal components received by the road surface signal detection unit 5, the reception level of the component corresponding to the vehicle speed calculated by the vehicle speed calculating unit 6 is compared in an axis displacement calculation processing unit 7 with a reference level prestored in a non-volatile memory 8, to determine the presence or absence of an axis displacement.

When determining the presence or absence of an axis displacement, the reception level of the reflected signal from the road surface 3, which is received by the road surface signal detection unit 5 and selected based on the result of the calculation performed by the vehicle speed calculating unit 6, is corrected for the gradient of the road detected by a gradient detection unit 9, and the reception level thus corrected is compared with the reference level stored in the non-volatile memory 8. As the reception level corrected for the road gradient is compared with the reference level, the axis displacement can be determined properly without being affected by the gradient.

The road surface detection apparatus 1 performs the axis displacement determination by also considering the time being measured by a timer 10. This is necessary in order not to erroneously determine that the axis is displaced, in situations where the reception level fluctuates widely due to vibration, etc. during vehicle movement.

FIGS. 2A1 and 2B1, FIGS. 2A2 and 2B2, and FIGS. 2A3 and 2B3 show the relationship between the reception level and the axis displacement of the radar beam 11 projected from the radar unit 4 when the vehicle is traveling over the road surface 3. FIGS. 2A1 to 2A3 schematically show the state of the axis displacement, and FIGS. 2B1 to 2B3 show the relationship between the reception level and the Doppler frequency received by the vehicle 2.

The radar beam 11 shown in FIGS. 2A1 to 2A3 indicates the direction along which the millimeter radio wave projected from the radar system mounted on the vehicle 2 has high energy. The greater the strength of the projected radio wave, the longer the distance from the projection source of the radio wave to the far end boundary of the radar beam 11. The shape of the radar beam 11 is dependent on the directivity of the antenna of the radar unit 4, and the antenna gain for signal reception is also shown by a similar shape.

Of course, radio waves projected from the radar unit 4 are also radiated outside the boundary of the radar beam 11, and signals from outside the radar beam 11 are also received. The range of the radar beam 11 can be treated as a radio wave projection area as the projected radio wave is particularly strong within this area.

FIGS. 2A1 and 2B1 shows the state in which the axis of the radar beam 11 is not displaced. Denoting the traveling speed of the vehicle 2 as vself, when the radar beam signal is projected from the radar unit 4 as shown by the radar beam 11, the reception level of the reflected signal scattered by the road surface 3 and received by the radar unit 4 is the highest at frequency fvself which is the Doppler component corresponding to the vehicle speed vself. Accordingly, for the radar beam 11 shown in FIG. 2A1 in which the radio wave is projected into the radio wave projection area from the radar unit 4 of the vehicle 2 in a free-from-axis-displacement condition, the peak value of the reception level of the reflected signal from the road surface 3 is taken as the reference level as shown in FIG. 2B1, and stored in the non-volatile memory 8 shown in FIG. 1.

The non-volatile memory 8 is, for example, an electrically rewritable non-volatile memory device called an EEPROM, or an electrically rewritable non-volatile memory called a flash ROM, or a storage means that stores information magnetically or optically. The state shown in FIGS. 2A1 and 2B1 in which the axis is not displaced can be easily obtained when the vehicle 2 travels on a flat road surface 3 and, for example, right after the radar unit 4 is installed in the vehicle 2.

FIGS. 2A2 and 2B2 show the state in which the axis of the projection direction of the radar beam 11 is displaced in the downward direction. As shown in FIG. 2A2, the radar beam 11 is tilted downward, forming a strong radio wave projection area over the road surface 3. As a result, the reception level at the Doppler frequency fvself corresponding to the vehicle speed vself becomes higher than the reference level, as shown in FIG. 2B2. A downward direction level is preset in a reception level range on the higher side of the reference level. Space is provided between the reference level and the downward direction level, and it is determined that the axis of the projection direction of the radar beam 11 is displaced in the downward direction, only when the reception level is judged to have exceeded the downward direction level for more than a predetermined time. The component of the Doppler frequency fvself can be extracted by converting a real-time signal into a signal in the frequency domain by such processing as a fast Fourier transform (FFT) using a digital signal processor (DSP) or a CPU.

When the reception level is higher than the reference level at the Doppler frequency fvself corresponding to the vehicle speed, as shown in FIG. 2B2, two possibilities can be considered: the axis of the projection direction of the radar beam 11 is displaced in the downward direction as shown in FIG. 2A2, or the radar beam 11 is reflected from an obstacle or a parked vehicle on the road surface 3 and its reflected signal is received. In view of this, a road surface outside level higher than the downward direction level is preset as shown in FIG. 2B2, and when the level of the Doppler signal component corresponding to the vehicle speed exceeds the road surface outside level, it is determined that the presence of an obstacle or the like, not an axis displacement, has been detected.

FIGS. 2A3 and 2B3 show the state in which the axis of the projection direction of the radar beam 11 is displaced in the upward direction. As shown in FIG. 2A3, when the axis of the projection direction of the radar beam 11 is displaced in the upward direction, the radio wave projection area moves away from the road surface 3 and the strength of the radio wave projected onto the road surface 3 weakens as the distance from the vehicle 2 in the forward direction increases. As a result, the strength of the radio wave reflected off the road surface 3 and returned to the radar unit 4 weakens. As shown in FIG. 2B3, the reception level is the highest at the Doppler frequency fvself corresponding to the vehicle speed vself, but the peak level is lower than the reference level. In view of this, an upward direction level is preset in a reception level range on the lower side of the reference level, and when the reception level has been lower than the upward direction level for more than a predetermined time, it is determined that the axis is displaced in the upward direction.

FIG. 3 shows an axis displacement determining procedure in the calculation process performed by the axis displacement calculation processing unit 7. In step 102, the radar unit 4 is installed in the vehicle 2, and in step 104, the road surface level is detected; then in step 106, the detected road surface level is set as the reference level and stored in the non-volatile memory 8. The road surface detection is performed by repeating the following process from step 108 to step 128.

In step 108, the traveling speed of the vehicle 2 is calculated by the vehicle speed calculating unit 6. In step 110, based on the vehicle speed calculated in step 108, the reception level as the peak value at the Doppler frequency fvself is detected as shown in FIGS. 2B1 to 2B3. In step 112, the detected reception level is compared with the reference level stored in the non-volatile memory 8, to determine whether the difference is outside the predefined range. The predefined range is the region bounded by the downward direction level and the upward direction level shown in FIGS. 2B1 to 2B3.

If it is determined in step 112 that the difference between the reception level and the reference level is not outside the predefined range but falls within the range between the downward direction level and the upward direction level, the process returns to step 108. On the other hand, if it is determined in step 112 that the difference between the reception level and the reference level is outside the predefined range, the process proceeds to step 114 to determine, using the timer 10, whether the level difference has been outside the predefined range for more than a predetermined time. If it is determined that the predetermined time has not yet elapsed, the process returns to step 108.

If, in step 114, it is determined that the level difference has been outside the predefined range for the predetermined time then, in step 116, it is determined whether or not the reception level is equal to or higher than the downward direction level. If it is determined that the reception level is equal to or higher than the downward direction level, then in step 118 it is determined whether or not the reception level is equal to or higher than the road surface outside level. If it is determined that the reception level is lower than the road surface outside level, then in step 120 it is determined that the axis is displaced in the downward direction, and in step 122 the result of the determination is stored in the non-volatile memory 8.

If, in step 116, it is determined that the reception level is lower than the downward direction level, then in step 124 it is determined whether or not the reception level is equal to or lower than the upward direction level. If it is determined that the reception level is equal to or lower than the upward direction level, then in step 126 it is determined that the axis is displaced in the upward direction, and in step 128, as in step 122, the result of the determination is stored in the non-volatile memory 8.

When the processing of step 122 or 128 is completed, or when it is determined in step 118 that the reception level is equal to or higher than the road surface outside level, or when it is determined in step 124 that the reception level is higher than the upward direction level, then the process returns to step 108.

With the above procedure, the processing can be performed to determine the axis displacement corresponding to the state shown in FIGS. 2A2 and 2B2 or FIGS. 2B3 and 2B3. The above embodiment has been described for the road surface detection assuming the use of an unmodulated continuous-wave radar system that uses millimeter radio waves, but the present invention can also be applied to the case where the presence or absence of an upward/downward axis displacement is checked by performing the road surface detection as part of the diagnosis run at system power up in a frequency-modulated continuous-wave radar or the like. Furthermore, the present invention is not limited in application to radar systems that use radio waves, but is equally applicable to radar systems that use laser beams or ultrasonic waves.

As described above, according to the present invention, the presence or absence of an axis displacement can be determined reliably, because when the radar beam signal is projected and reflected off the road surface, the reception level of the reflected signal is compared with the reference level which is prestored in the non-volatile storage means as the reception level when there is no axis displacement and, if the difference between them is large, it is determined that the axis is displaced.

According to the present invention, if the reception level detected by the road surface signal detecting means is higher than the reference level, it can be determined that the axis is displaced in the downward direction.

According to the present invention, if the reception level detected by the road surface signal detecting means is higher than the reference level by more than a predetermined amount, it can be determined that the axis of the radar beam projection direction is displaced in the upward direction.

Furthermore, according to the present invention, in the case of a sloping road, the road gradient is detected, based on which the reception level obtained from the road surface signal detecting means is corrected, and the reception level thus corrected is compared with the reference level; as a result, the presence or absence of an axis displacement can be determined reliably by substantially eliminating the effect of the road gradient.

Further, according to the present invention, as the result of the determination made by the axis displacement determining means is stored in the non-volatile storage means, the axis displacement can be corrected easily by taking the vehicle to a service factory or the like after the axis displacement is detected.

A second embodiment of the present invention will be described below with reference to accompanying drawings.

Figure 4:
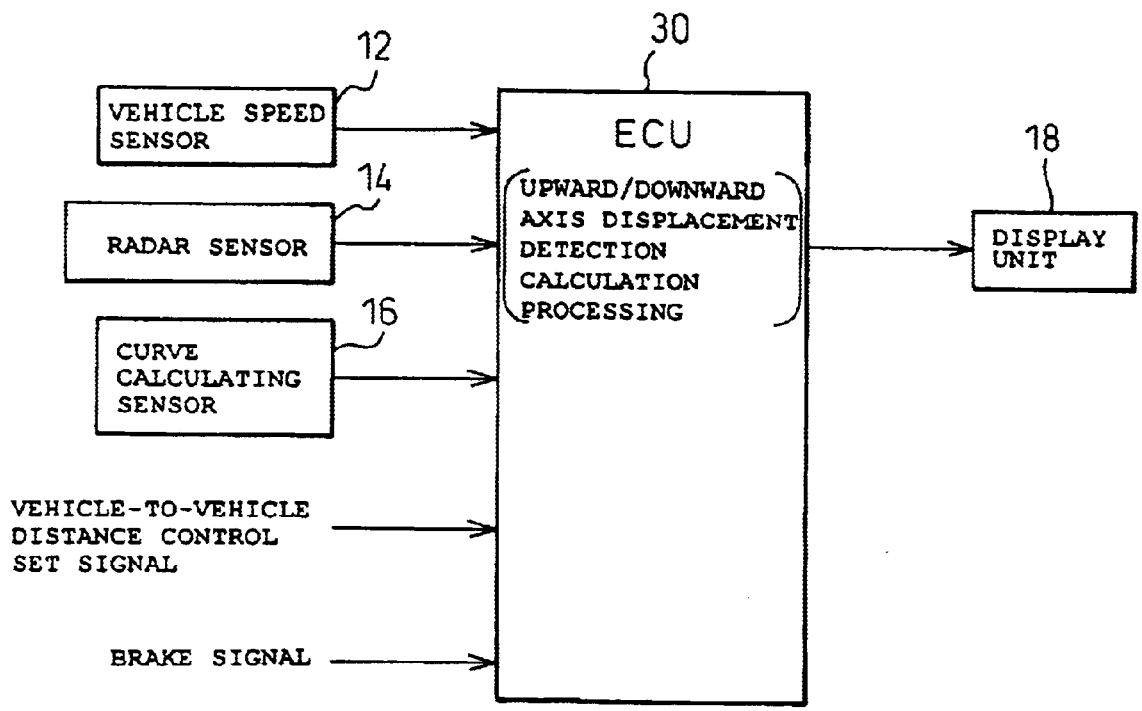
FIG. 4 is a diagram showing the configuration of an apparatus for detecting an upward/downward axis displacement in a vehicle-mounted radar according to a second embodiment of the present invention.

FIG. 4 is a diagram showing the configuration of an apparatus for detecting an upward/downward axis displacement in a vehicle-mounted radar according to the second embodiment of the present invention. In FIG. 4, a vehicle speed sensor 12 generates output pulses the number of which per unit time is proportional to the rotational speed of the transmission shaft of the vehicle, that is, the vehicle speed. A radar sensor 14 is a sensor, such as a millimeter-wave radar, for measuring the distance to a target. A curve calculating sensor 16 comprises a yaw rate sensor or the like that detects the angular velocity (yaw rate) of the vehicle about a vertical axis, and is used to calculate the radius of a curve.

It is possible to determine whether the detected target is a stationary object or a moving object from the vehicle speed detected by the vehicle speed sensor 12 and the distance to the target detected by the radar sensor 14. Further, by the use of the curve calculating sensor 16, the beam from the radar sensor can be projected toward a target such as a vehicle traveling ahead, even when the radar-equipped vehicle is traveling around a curve.

An ECU (Electronic Control Unit) 30 comprises a CPU (Central Processing Unit), memory, etc. and performs the following calculation operations for upward/downward axis displacement detection based on the output signals of the vehicle speed sensor 12, the radar sensor 14, and the curve calculating sensor 16, on a set signal for initiating vehicle-to-vehicle distance control for causing the radar-equipped vehicle to follow a vehicle traveling ahead in the same lane while measuring the distance to the vehicle ahead, and on a brake signal indicating the braking condition of the radar-equipped vehicle. A display unit 18 is an output device for displaying diagnosis results, such as the result of the upward/downward axis displacement detection, under instruction from the ECU 30.

Figure 5A:
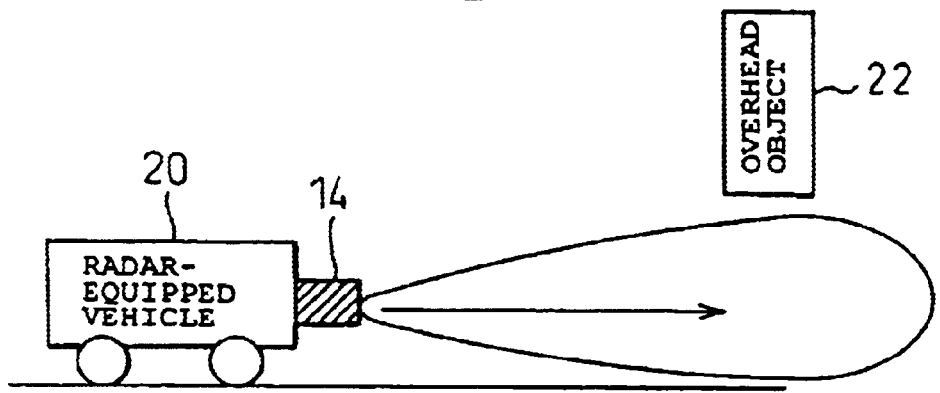
FIGS. 5A to 5C are diagrams showing the relationship between the radar area of a radar sensor mounted on a vehicle and a stationary object located above the road.
Figure 5B:
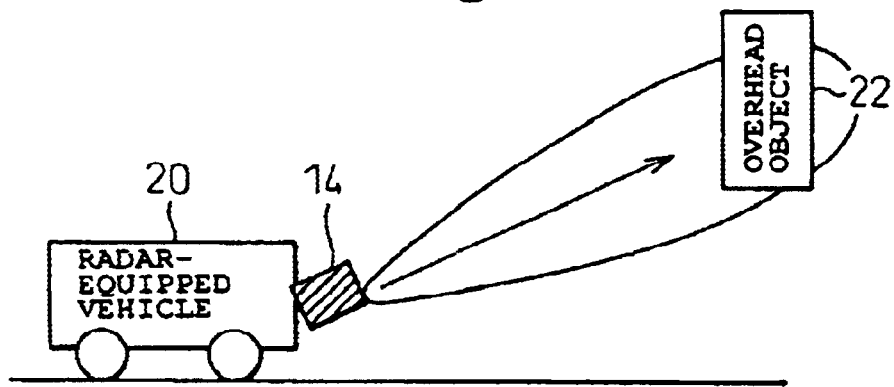
Figure 5C:
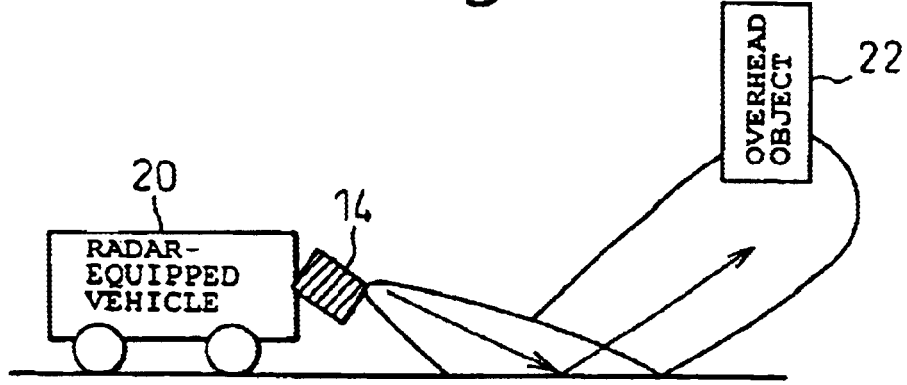

FIGS. 5A to 5C are diagrams showing the relationship between the radar area of the radar sensor 14 mounted on the vehicle 20 and a stationary object 22 located above the road: FIG. 5A shows the state in which the axis is not displaced, FIG. 5B shows the state in which the axis is displaced in the upward direction, and FIG. 5C shows the state in which the axis is displaced in the downward direction.

As can be seen from the figures, when the vehicle 20 approaches the stationary object (overhead object) 22 and passes by it or below it, if the axis is displaced in the upward direction (FIG. 5B), the stationary object 22 can be detected up to a point closer to the stationary object 22 than when the axis is not displaced (FIG. 5A). When the axis is displaced in the downward direction (FIG. 5C), the stationary object 22 can also be detected up to a point closer to the stationary object 22 than when the axis is not displaced (FIG. 5A), because the beam reflected off the road surface is directed upward.

Figure 6A:
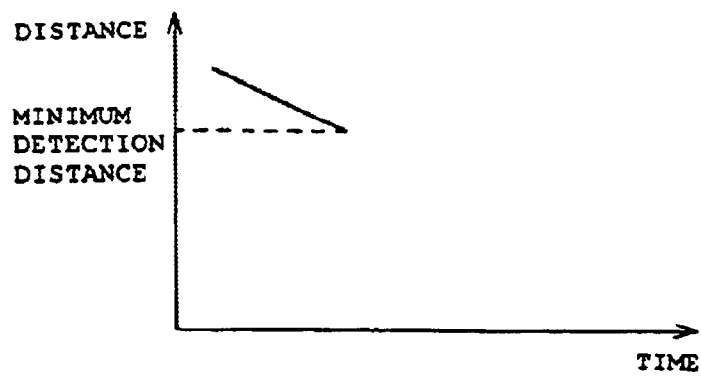
FIGS. 6A to 6C are diagrams showing how the detection distance for the stationary object located above the road changes with time as the radar-equipped vehicle approaches the stationary object.
Figure 6B:
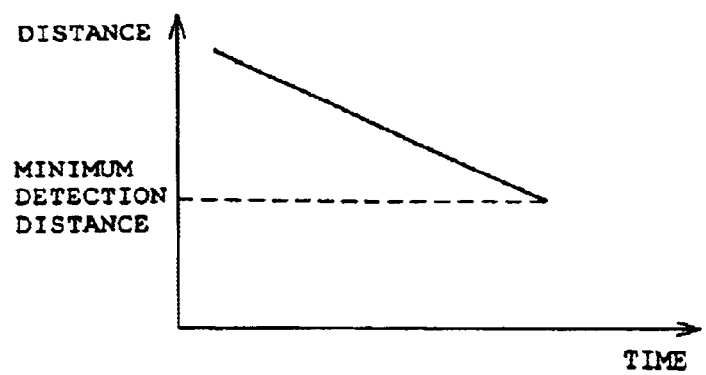
Figure 6C:
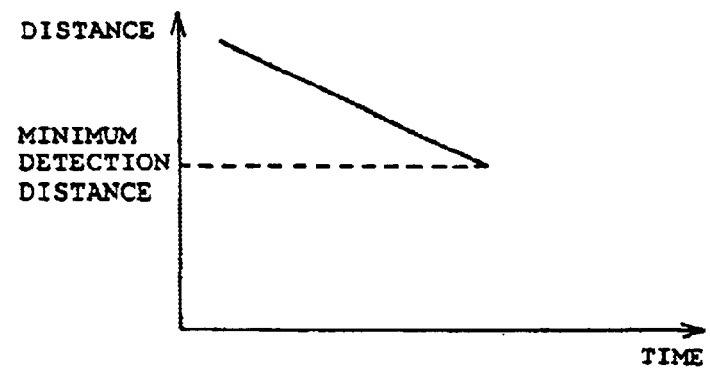

That is, as the vehicle 20 approaches the stationary object 22, the detection distance for the stationary object 22 changes with time as shown in FIGS. 6A to 6C. These figures correspond to FIGS. 5A to 5C; that is, FIG. 6A shows the state in which the axis is not displaced, FIG. 6B shows the state in which the axis is displaced in the upward direction, and FIG. 6C shows the state in which the axis is displaced in the downward direction. As shown, when the axis is displaced in the upward or downward direction, the stationary object 22 can be detected up to a point closer to the stationary object 22 than when the axis is not displaced, and as a result, the minimum detection distance becomes shorter.

Figure 7:
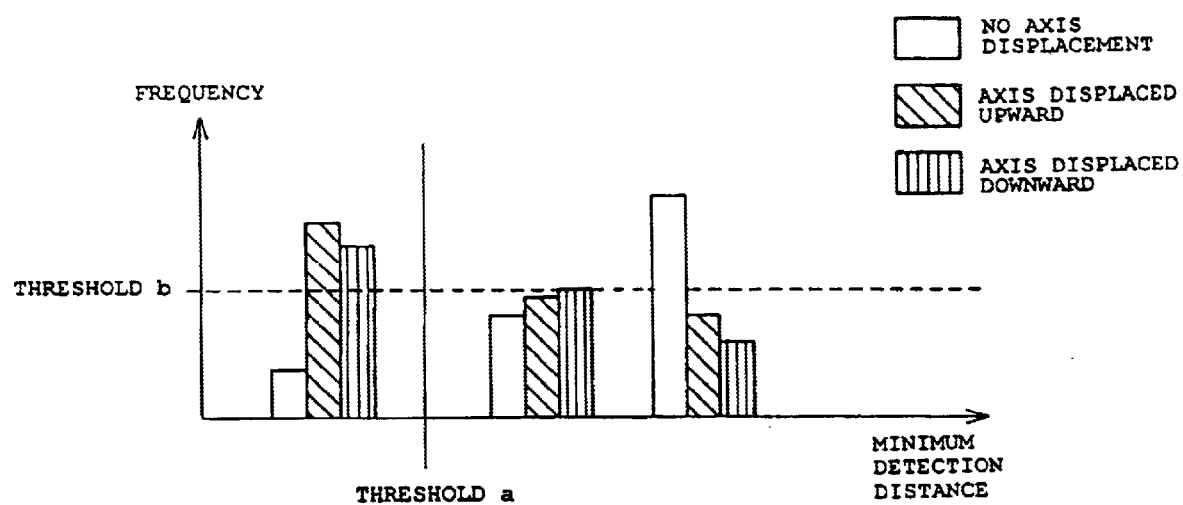
FIG. 7 is a diagram showing the segment-by-segment detection frequencies of a minimum detection distance for the stationary object, for the case of no axis displacement, the case of upward axis displacement, and the case of downward axis displacement, respectively.

Accordingly, when data on such minimum detection distances is gathered and the minimum detection distance range is divided into three segments, a histogram showing their relative frequencies can be drawn, depicting the differences between the case of no axis displacement, the case of upward axis displacement, and the case of downward axis displacement, as shown in FIG. 7. As can be seen, when the axis is not displaced, the frequency is lower in the shorter minimum detection distance segment, while when the axis is displaced in the upward or downward direction, the frequency is higher in the shorter minimum detection distance segment. This means that for the frequency with which the minimum detection distance becomes smaller than a threshold value "a", a threshold value "b" for determining the presence or absence of an upward/downward axis displacement can be set in advance as shown in FIG. 7.

In view of this, each time a stationary overhead object is detected by the radar sensor 14, the ECU 30 gathers data on its minimum detection distance. When the data has been gathered up to a certain amount, the ECU 30 calculates, based on the gathered data, the frequency with which the minimum detection distance becomes smaller than the threshold value "a". Then, if the frequency is higher than the threshold value "b", the ECU 30 determines that the axis is displaced in the upward or downward direction.

Figure 8A:
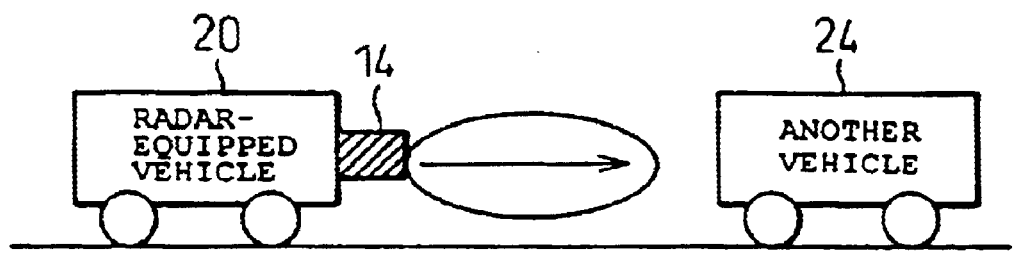
FIGS. 8A to 8C are diagrams showing the relationship between the radar area of the radar sensor mounted on the vehicle and another vehicle (vehicle traveling in front) as a moving object.
Figure 8B:
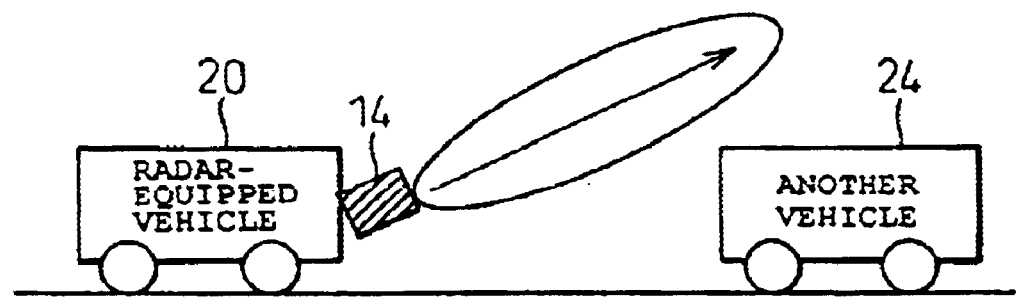
Figure 8C:
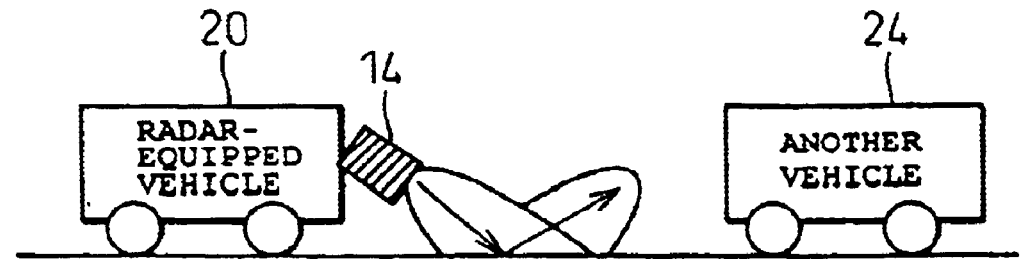

FIGS. 8A to 8C are diagrams showing the relationship between the radar area of the radar sensor 14 mounted on the vehicle 20 and another vehicle (vehicle traveling in front) 24 as a moving object: FIG. 8A shows the state in which the axis is not displaced, FIG. 8B shows the state in which the axis is displaced in the upward direction, and FIG. 8C shows the state in which the axis is displaced in the downward direction.

As can be seen from the figures, when the distance of the vehicle 24 relative to the radar-equipped vehicle 20 increases, if the axis is displaced in the upward direction (FIG. 8B), the distance beyond which the vehicle 24 in front cannot be detected is shorter than when the axis is not displaced (FIG. 8A), because the projected beam is directed upward. When the axis is displaced in the downward direction (FIG. 8C), the vehicle 24 in front goes out of the detection range earlier than when the axis is not displaced (FIG. 8A), because the beam reflected off the road surface is directed upward.

Figure 9A:
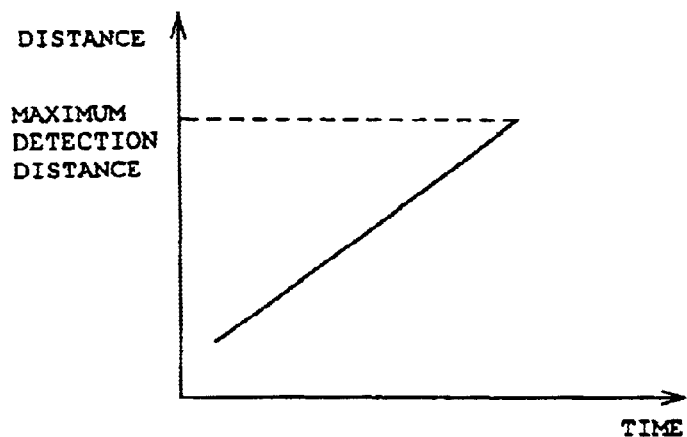
FIGS. 9A to 9C are diagrams showing how the detection range for another vehicle (moving object) changes with time as that other vehicle moves farther away from the radar-equipped vehicle.
Figure 9B:
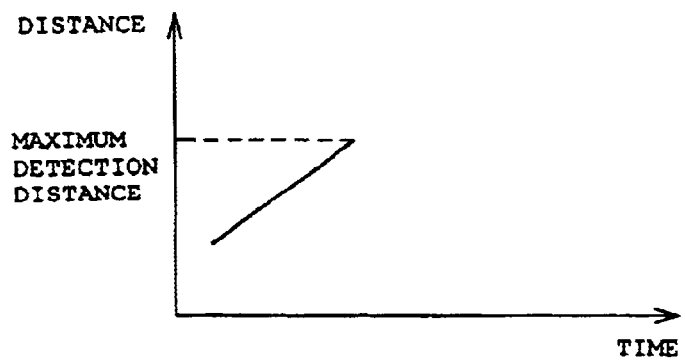
Figure 9C:
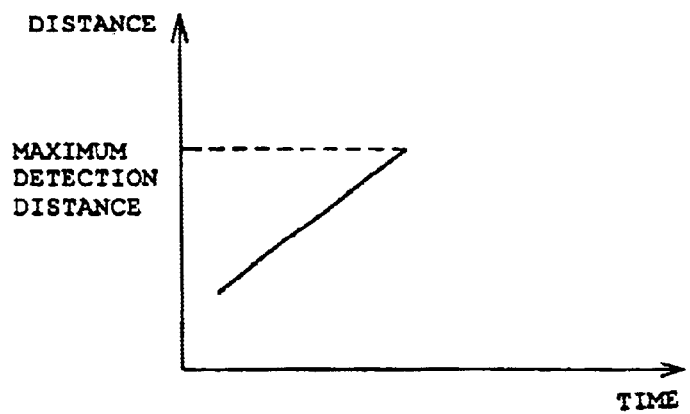

That is, as the vehicle 24 in front moves farther away from the radar-equipped vehicle 20, the detection distance for the vehicle 24 in front changes with time as shown in FIGS. 9A to 9C. These figures correspond to FIGS. 8A to 8C; that is, FIG. 9A shows the state in which the axis is not displaced, FIG. 9B shows the state in which the axis is displaced in the upward direction, and FIG. 9C shows the state in which the axis is displaced in the downward direction. As shown, when the axis is displaced in the upward or downward direction, the vehicle 24 in front goes out of the detection range earlier than when the axis is not displaced and, as a result, the maximum detection distance becomes shorter. The same can be said of the maximum detection distance when the distance of the vehicle 24 relative to the vehicle 20 decreases.

Figure 10:
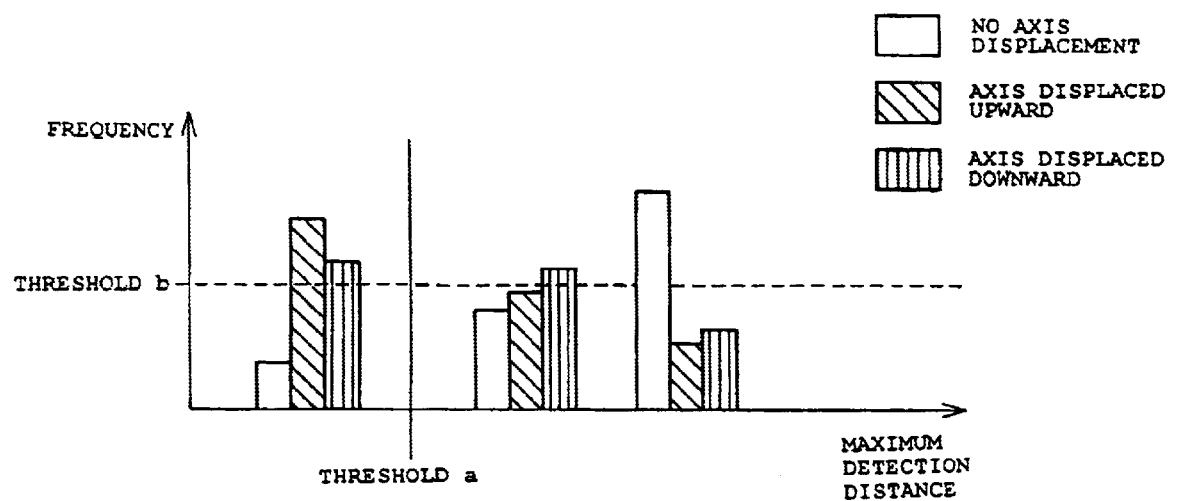
FIG. 10 is a diagram showing the segment-by-segment detection frequencies of a maximum detection distance for the moving object, for the case of no axis displacement, the case of upward axis displacement, and the case of downward axis displacement, respectively.

Accordingly, when data on such maximum detection distances is gathered and the maximum detection distance range is divided into three segments, a histogram showing their relative frequencies can be drawn, depicting the differences between the case of no axis displacement, the case of upward axis displacement, and the case of downward axis displacement, as shown in FIG. 10. As can be seen, when the axis is not displaced, the frequency is lower in the shorter maximum detection distance segment, while when the axis is displaced in the upward or downward direction, the frequency is higher in the shorter maximum detection distance segment. As a result, for the frequency with which the maximum detection distance becomes lower than a threshold value "a", a threshold value "b" for determining the presence or absence of an upward/downward axis displacement can be set in advance as shown in FIG. 10.

In view of this, each time a moving object is detected by the radar sensor 14, the ECU 30 gathers data on its maximum detection distance. When the data has been gathered up to a certain amount, the ECU 30 calculates, based on the gathered data, the frequency with which the maximum detection distance becomes smaller than the threshold value "a". Then, if the frequency is higher than the threshold value "b", the ECU 30 determines that the axis is displaced in the upward or downward direction.

Figure 11A:
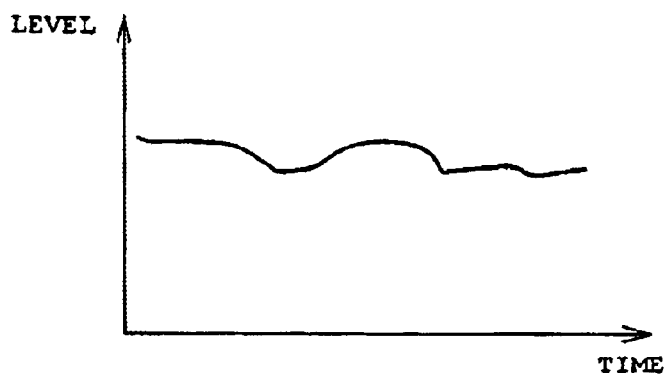
FIGS. 11A to 11C are diagrams showing how the level of reflection from another vehicle (moving object) changes with time.
Figure 11B:
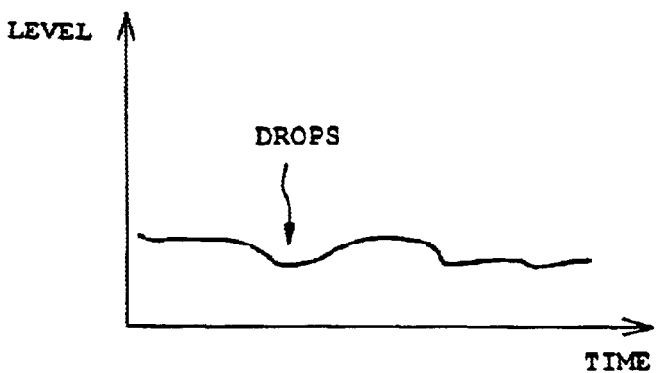
Figure 11C:
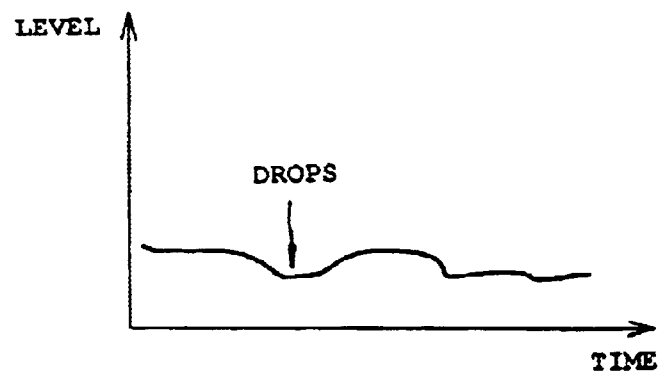

As can be seen from FIGS. 8A to 8C, when the axis is displaced in the upward or downward direction (FIGS. 8B and 8C), the level of reflection from the vehicle (moving object) 24 is lower than when the axis is not displaced (FIG. 8A). That is, the level of reflection from the vehicle 24 changes with time as shown in FIGS. 11A to 11C. These figures correspond to FIGS. 8A to 8C; that is, FIG. 11A shows the state in which the axis is not displaced, FIG. 11B shows the state in which the axis is displaced in the upward direction, and FIG. 11C shows the state in which the axis is displaced in the downward direction. As shown, when the axis is displaced in the upward or downward direction, the reflection level is lower at any instant in time than when the axis is not displaced.

Figure 12:
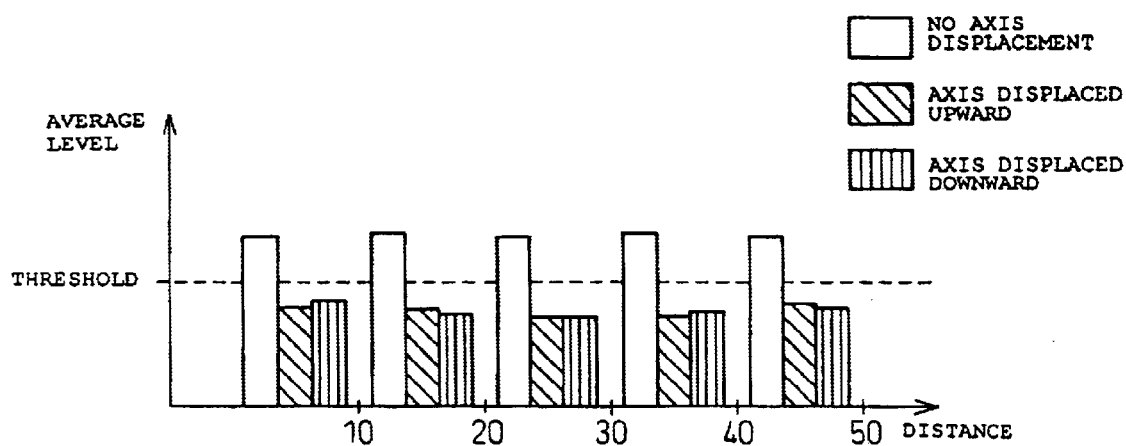
FIG. 12 is a diagram showing the averages of reflection levels from the moving object on a segment by segment basis when the detection distance for the moving object is divided into several segments at intervals of 10 meters.

Accordingly, when the detection distance range for the moving object is divided into several segments at intervals of 10 meters, and data on reflection levels from the moving object is gathered for a predetermined period of time, the average values can be plotted, depicting the differences between the case of no axis displacement and the case of upward/downward axis displacement, as shown in FIG. 12. As can be seen, when the axis is displaced in the upward or downward direction, the average level is lower, in any segment, than when the axis is not displaced. Thus, a threshold value for determining the presence or absence of an upward/downward axis displacement can be set in advance for the average level.

In view of this, for the moving object detected by the radar sensor 14, the ECU 30 calculates the average value of the reflection levels for each distance segment over a predetermined time. When the calculated average value is smaller than the threshold value, the ECU 30 determines that the axis is displaced in the upward or downward direction.

Further, when the axis is displaced in the upward or downward direction as shown in FIG. 8B or 8C, if the vehicle-to-vehicle distance control by the radar is initiated, it is difficult to maintain a predetermined distance from the vehicle in front, so that the driver has to re-set the vehicle-to-vehicle distance control or apply the brakes more frequently than when the axis is not displaced.

Figure 13A:
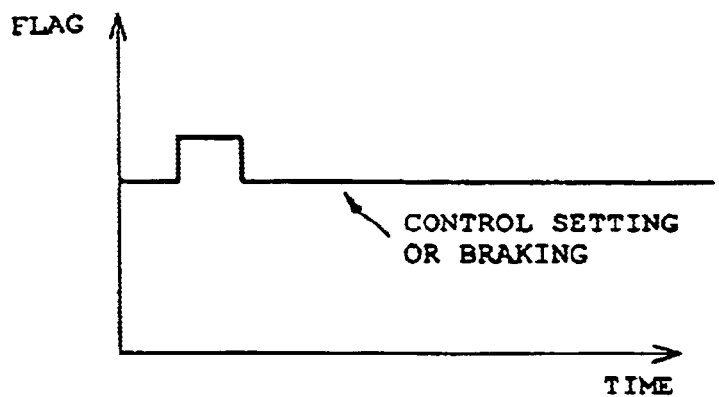
FIGS. 13A to 13C are diagrams showing how a flag indicating the occurrence of a vehicle-to-vehicle distance control setting operation or a braking operation changes with time.
Figure 13B:
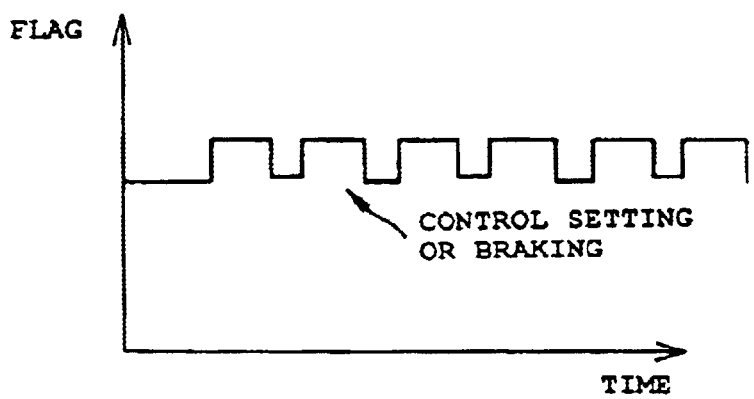
Figure 13C:
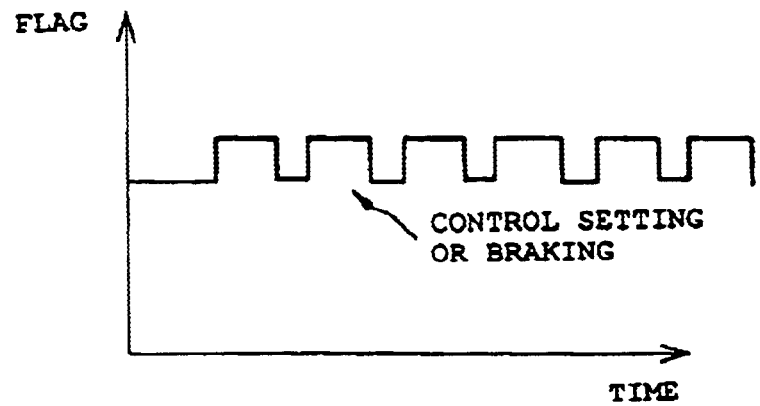

That is, a flag indicating the occurrence of a vehicle-to-vehicle distance control setting operation or a braking operation changes as shown in FIGS. 13A to 13C with respect to time. These figures correspond to FIGS. 8A to 8C; that is, FIG. 13A shows the state in which the axis is not displaced, FIG. 13B shows the state in which the axis is displaced in the upward direction, and FIG. 13C shows the state in which the axis is displaced in the downward direction. As shown, when the axis is displaced in the upward or downward direction, the vehicle-to-vehicle distance control setting operation or the braking operation is performed more frequently than when the axis is not displaced.

Figure 14:
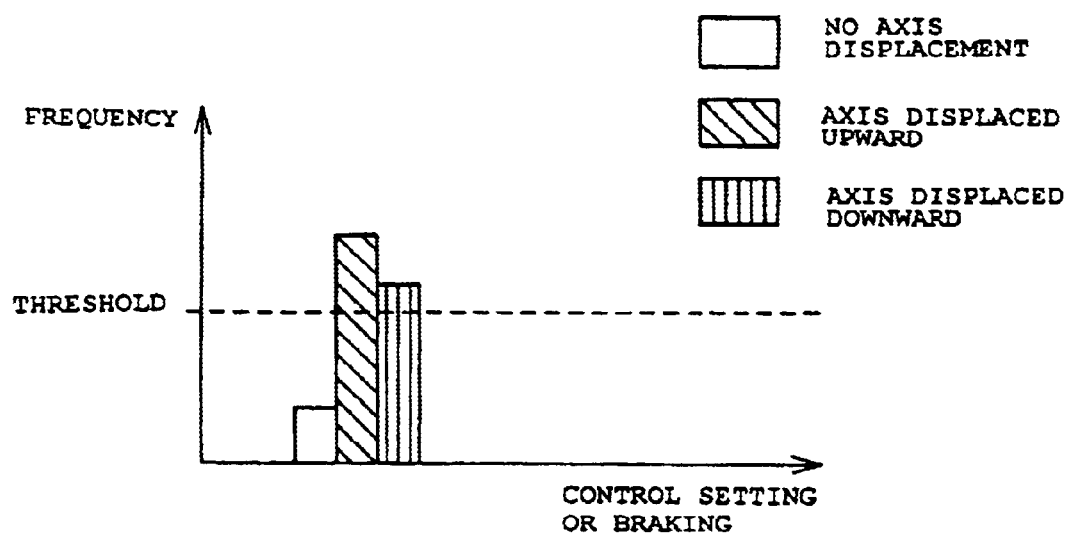
FIG. 14 is a diagram showing the frequencies of the vehicle-to-vehicle distance control setting operation and braking operation.

Accordingly, when the vehicle-to-vehicle distance control setting operation and the braking operation are detected from the vehicle-to-vehicle distance control set signal and the brake signal after initiating the vehicle-to-vehicle control, and their frequencies are plotted, the differences between the case of no axis displacement and the case of upward/downward axis displacement can be shown as depicted in FIG. 14. As can be seen, when the axis is displaced in the upward or downward direction, the vehicle-to-vehicle distance control setting operation or the braking operation is performed more frequently than when the axis is not displaced. Thus, a threshold value for determining the presence or absence of an upward/downward axis displacement can be set in advance for the frequency of the vehicle-to-vehicle distance control setting operation or the braking operation.

In view of this, during the vehicle-to-vehicle control performed using the radar sensor 14, the ECU 30 detects the control re-setting operation or the braking operation for a predetermined period of time. When the frequency of the vehicle-to-vehicle distance control setting operation or the braking operation is higher than the threshold value, the ECU 30 determines that the axis is displaced in the upward or downward direction.

As described above, according to the present invention, there is provided an apparatus for detecting an upward/downward axis displacement, in a simple and accurate manner, in a vehicle-mounted radar.

What is claimed is:

1. A road surface detection apparatus, mounted on a vehicle, for gathering information about a road surface, comprising:
    transmitting/receiving means for projecting a radar beam signal onto the road surface on which the vehicle is traveling, and for receiving a signal containing a reflected signal of the radar beam signal;
    gradient detecting means for detecting a gradient of the road on which the vehicle is traveling; and
    axis displacement determining means for correcting the level of the reflected signal, reflected from the road surface and contained in the signal received by the transmitting/receiving means, based on the gradient of the road detected by the gradient detecting means, for comparing the corrected reflected signal level with a predetermined reference level and for determining that an axis defining a projection direction of the radar beam signal is displaced, if the result of the comparison lies outside a predefined range.

2. A road surface detection apparatus, mounted on a vehicle, for gathering information about a road surface by projecting a radar beam signal onto the road surface on which the vehicle is traveling, and by receiving a signal containing a reflected signal of the radar beam signal reflected from the road surface, the apparatus comprising:
    road surface signal detecting means for detecting the reflected signal reflected from the road surface and contained in the received signal;
    gradient detecting means for detecting a gradient of the road on which the vehicle is traveling;
    storage means for pre-storing as a reference level the reception level of the reflected signal reflected from the road surface and detected by the road surface signal detecting means when there is no axis displacement in the projection direction of the radar beam signal; and
    axis displacement determining means for correcting, when the vehicle is traveling, the reception level of the reflected signal reflected from the road surface and detected by the road surface signal detecting means, based on the gradient of the road detected by the gradient detecting means, for comparing the corrected reception level with the reference level stored in the storage means and for determining that an axis defining a projection direction of the radar beam signal is displaced, if the result of the comparison lies outside a predefined range.

3. A road surface detection apparatus as claimed in claim 2 wherein, when the reception level detected by the road surface signal detecting means has been outside the predefined range on the higher side of the reference level for a predetermined period of time, the axis displacement determining means determines that the axis is displaced in a downward direction.

4. A road surface detection apparatus as claimed in claim 3 wherein, when the reception level detected by the road surface signal detecting means has been equal to or higher than a road surface outside level preset at a higher point than the predefined range for the predetermined period of time, the axis displacement determining means determines that the reception level is for a signal reflected from an object other than the road surface, and does not determine that the axis is displaced in the downward direction.

5. A road surface detection apparatus as claimed in any one of claims 2 to 4 wherein, when the reception level detected by the road surface signal detecting means has been outside the predefined range on the lower side of the reference level for the predetermined period of time, the axis displacement determining means determines that the axis is displaced in an upward direction.

6. A road surface detection apparatus as claimed in claim 2, wherein,
    when performing the axis displacement determination, the axis displacement determining means compares the reception level detected by the road surface signal detecting means with the reference level after correcting the reception level based on the gradient of the road detected by the gradient detecting means.

7. A road surface detection apparatus as claimed in any on of claims 2 to 4, wherein the axis displacement determining means stores the result of the axis displacement determination in the storage means.

8. A road surface detection apparatus, mounted on a vehicle, for gathering information about a road surface by projecting a radar beam signal onto the road surface on which the vehicle is traveling, and by receiving a signal containing a reflected signal of the radar beam signal reflected from the road surface, the apparatus comprising:
    road surface signal detecting means for detecting the reflected signal reflected from the road surface and contained in the received signal;
    storage means for pre-storing as a reference level the reception level of the reflected signal reflected from the road surface and detected by the road surface signal detecting means when there is no axis displacement in the projection direction of the radar beam signal; and axis displacement determining means for comparing, when the vehicle is traveling, the reception level of the reflected signal reflected from the road surface and detected by the road surface signal detecting means with the reference level stored in the storage means and for determining that an axis defining the projection direction of the radar beam signal is displaced, if the result of the comparison lies outside a predefined range wherein, when the reception level detected by the road surface signal detecting means has been outside the predefined range on the higher side of the reference level for a predetermined period of time, the axis displacement determining means determines that the axis is displaced in a downward direction.

9. A road surface detection apparatus, mounted on a vehicle, for gathering information about a road surface by projecting a radar beam signal onto the road surface on which the vehicle is traveling, and by receiving a signal containing a reflected signal of the radar beam signal reflected from the road surface, the apparatus comprising:

road surface signal detecting means for detecting the reflected signal reflected from the road surface and contained in the received signal;

storage means for pre-storing as a reference level the reception level of the reflected signal reflected from the road surface and detected by the road surface signal detecting means when there is no axis displacement in the projection direction of the radar beam signal;

axis displacement determining means for comparing, when the vehicle is traveling, the reception level of the reflected signal reflected from the road surface and detected by the road surface signal detecting means with the reference level stored in the storage means and for determining that an axis defining the projection direction of the radar beam signal is displaced, if the result of the comparison lies outside a predefined range; and gradient detecting means for detecting the gradient of the road on which the vehicle is traveling and wherein, when performing the axis displacement determination, the axis displacement determining means compares the reception level detected by the road surface signal detecting means with the reference level after correcting the reception level based on the gradient of the road detected by the gradient detecting means.

* * * * *

UNITED STATES PATENT AND TRADEMARK OFFICE
CERTIFICATE OF CORRECTION

PATENT NO. : 6,896,082 B2
DATED : May 24, 2005
INVENTOR(S) : Asanuma et al.

It is certified that error appears in the above-identified patent and that said Letters Patent is hereby corrected as shown below:

<u>Title page,</u>
Item [56], References Cited, FOREIGN PATENT DOCUMENTS,
delete "DE      30 22 048 C2      2/1982" and "JP      56-665      7/1981".

<u>Column 14,</u>
Line 50, delete "any on" insert -- any one --.

Signed and Sealed this

Eighteenth Day of April, 2006

JON W. DUDAS
*Director of the United States Patent and Trademark Office*